United States Patent [19]

Spector

[11] Patent Number: 5,206,842
[45] Date of Patent: Apr. 27, 1993

[54] TECHNIQUE FOR PRODUCING RECORDINGS OF MUSICAL WORKS WHOSE BEAT SIMULATES ARCADE-GAME SOUNDS

[76] Inventor: Donald Spector, 380 Mountain Rd., Union City, N.J. 07087

[21] Appl. No.: 410,341

[22] Filed: Sep. 21, 1989

[51] Int. Cl.⁵ .......................... G10F 1/00; H04B 1/20; G11B 31/00
[52] U.S. Cl. ......................................... 369/4; 84/713; 369/70
[58] Field of Search .................. 369/4, 30, 31, 63, 69, 369/70, 292; 84/713

[56] References Cited

U.S. PATENT DOCUMENTS

| | | | |
|---|---|---|---|
| 2,230,949 | 2/1941 | Heller et al. | 369/4 |
| 2,402,095 | 6/1946 | Slyfield | 369/4 |
| 3,049,965 | 8/1962 | Gunst | 369/4 |
| 3,781,452 | 12/1973 | Vauclain | 84/1.28 |
| 4,067,049 | 1/1978 | Kelly et al. | 360/14 |
| 4,089,245 | 5/1978 | Dietrich | 84/713 |
| 4,177,706 | 12/1979 | Greenberger | 84/1.01 |
| 4,198,891 | 4/1980 | Weber | 84/713 |
| 4,628,788 | 12/1986 | Shibukawa | 84/713 |
| 4,630,519 | 12/1986 | Hirano et al. | 84/713 |

Primary Examiner—Stuart S. Levy
Assistant Examiner—Christopher R. Glembocki
Attorney, Agent, or Firm—Michael Ebert

[57] ABSTRACT

A technique for recording a performance of a musical work having a persistent, accented beat in which substituted for this beat are synthesized sound effects simulating those associated with arcade electronic games in a percussive format. Hence when the recording is played back, the listener receives an acoustical image in which the music is heard in an arcade-like environment. To produce this recording, a system is provided in which characteristic arcade game sound effects are simulated in a music synthesizer for audio duplication and are reduced to a single keystroke, thereby enabling an operator to generate a percussive audio pulse which is mixed in a recording with the other components of the performed work. When the recording is played back, it incorporates these arcade game sound-effects pulses which define the accented beat of the music.

3 Claims, 1 Drawing Sheet

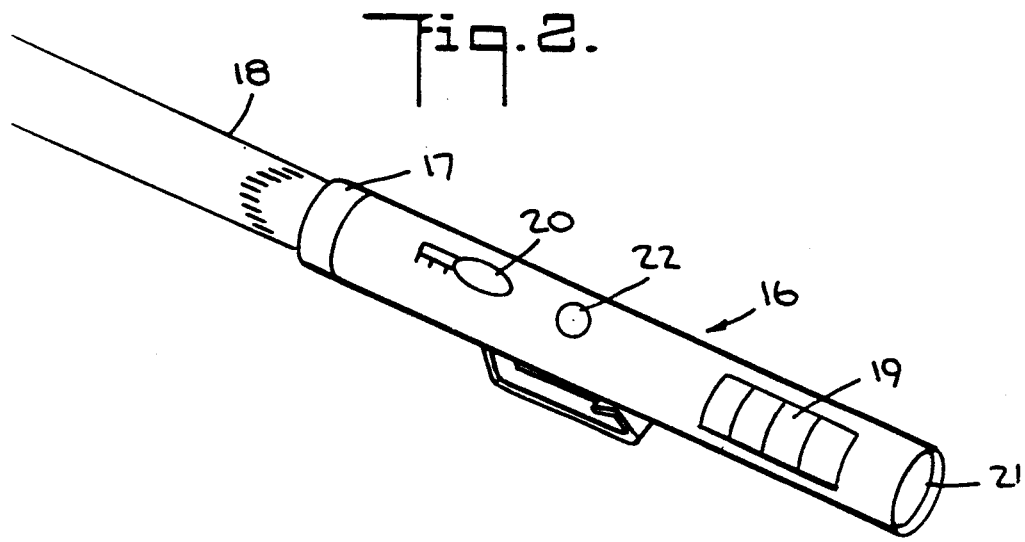
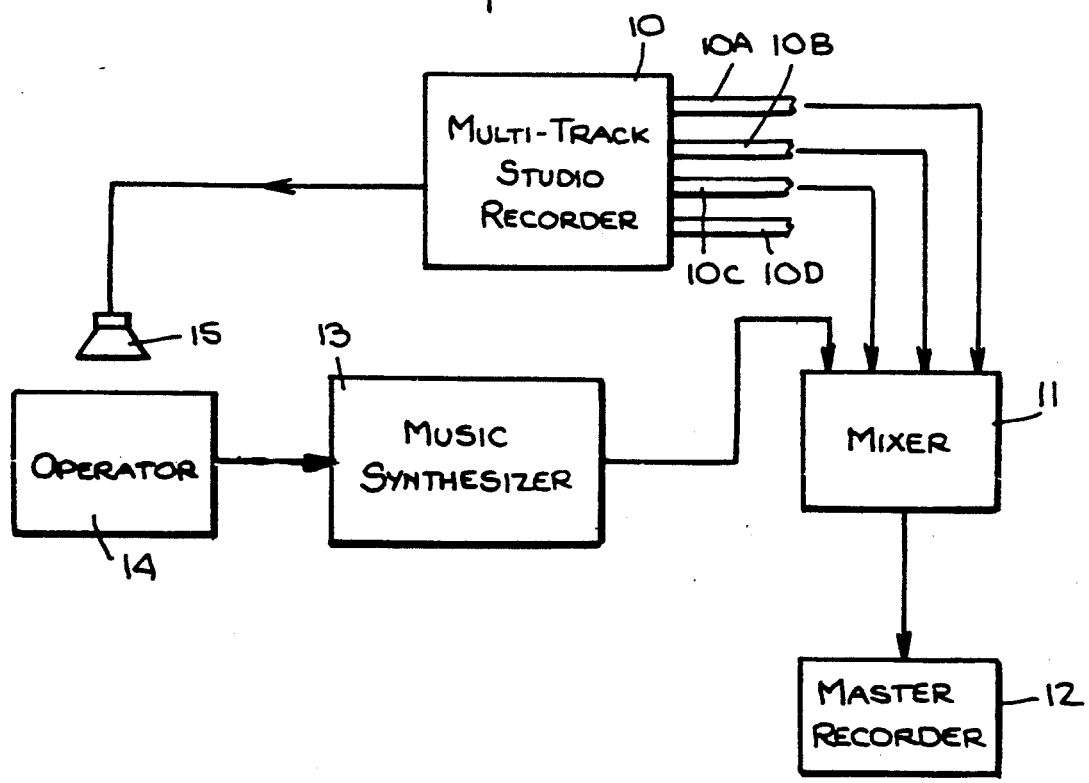

TECHNIQUE FOR PRODUCING RECORDINGS OF MUSICAL WORKS WHOSE BEAT SIMULATES ARCADE-GAME SOUNDS

BACKGROUND OF INVENTION

1. Field of Invention

This invention relates generally to the recording of a musical work having an accented beat, and more particularly to a technique in which synthesized sound effects simulating those associated with an arcade electronic game in a percussive format are incorporated in the recording, and to a system for carrying out the technique.

2. Status of Prior Art

The advent of integrated circuits and microprocessors has made possible electronic games, all of which include a video display terminal and manual controls, such as pushbuttons and joysticks which operate game control circuits linked to the terminal. In an arcade game of this type, the game is coin operated.

As a player watches the game displayed on the video screen, he can act on the display by manipulating the controls. Hence the input of the game is the control actions taken by the player, and its output which appears on the screen is the result of the input actions (See "Electronic Games"—Buchsbaum and Mauro—McGraw Hill—1979).

An important aspect of an arcade-type electronic game lies in the sound effects accompanying play. These effects are complex sounds, largely aggressive in nature. Typically, the sounds are related to shooting an enemy target, whether the target is a plane, a boat, a submarine or a space ship. The sound effects which are electronically generated may simulate a gunshot, a jet plane, a flying saucer or a propeller-driven aircraft. To simulate a flying saucer traveling in space, a pulsating whistle sound may be generated. The appeal of a given game depends in good part on ingenious sound effects, and this may induce a player to insert another coin at the completion of a game.

The sound effects accompanying an arcade-type game not only add a realistic touch to the game being played to heighten the excitement of play, but they also serve to induce stress and tension in the player. Many children and teenagers today spend hours in an arcade playing Nintendo, Sega, and other popular electronic games, almost to the point of addiction. These young players are thoroughly familiar with the sound effects characteristic of each game, and should they hear these sound effects, they can immediately identify their source.

Many of the same young players attend discos where they dance to recorded rock music. Disco clubs often feature flamboyant decor and special lighting to create an atmosphere highly stimulating to the dancers. Rock music, which is normally played on electronic instruments, is characterized by a persistent, heavily-accented beat, the repetition of simple phrases, and it often includes country, folk, and blues elements.

A technique in accordance with the present invention makes use of a music synthesizer. Music synthesizers are well known and employ computers and tone generators to synthesize complex wave shapes which are audibly presented to the user (see U.S. Pat. No. 4,177,706).

SUMMARY OF INVENTION

The main object of this invention is to provide a technique for producing a recording of rock or other music having a persistent, accented beat, in which substituted for the beat are synthesized sound effects in a percussive format associated with arcade electronic games, and to provide a system for carrying out this technique.

More particularly, an object of this invention is to provide a recording of the above type which when played back subjects the listener to an acoustical image in which rock music is heard in a stimulating arcade-like environment.

Among the advantages of the invention are the following:

A. When a listener hears a recording of a song with which he is not familiar, because the listener is likely to recognize the accompanying characteristic arcade game sound effects, this lends a degree of recognition to an otherwise unfamiliar song, and in doing so may induce the listener to purchase the recording. It goes without saying that the primary objective of the recording industry is to maximize the sale of recordings.

B. Because the arcade sound effects induce tension and stress on the listener, this acts to stimulate the listener to participate in dancing to the music.

C. While the repetitive nature of rock music has a somewhat dulling effect, this is overcome by the arcade game sound effects beat, thereby imparting greater excitement to the music.

Music generally is not an abstract, self-contained art form, for by suggesting in its rhythm or in its melodic pattern, galloping horses, a turbulent ocean, a thunderstorm, a fire or other excitement-inducing activity, the listener is stimulated thereby. Rock music, on the other hand, is less expressive in this regard; for while its repetitive, highly accented beat produces a strong visceral reaction, it otherwise makes reference to no extrinsic activity. A significant feature of the present invention is that the rock music recording enlarges the expressive range of the music to create an acoustic image that includes an arcade.

Briefly stated these objects are attained in a technique for recording a performance of a musical work having a persistent, accented beat in which substituted for this beat are synthesized sound effects simulating those associated with arcade electronic games in a percussive format. Hence when the recording is played back, the listener receives an acoustical image in which the music is heard in an arcade-like environment. To produce this recording, a system is provided in which characteristic arcade game sound effects are simulated in a music synthesizer for audio duplication and are reduced to a single keystroke, thereby enabling an operator to generate a percussive audio pulse which is mixed in a recording with the other components of the performed work. When the recording is played back, it incorporates these arcade game sound-effects pulses which define the accented beat of the music.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a block diagram of a system in accordance with the invention for producing a recording of rock or other music having a persistent, accented beat in which substituted for this beat are arcade game sound effects in a percussive format; and FIG. 2 is a perspective view of a disco arcade game sound laser beam device in accordance with the invention.

DESCRIPTION OF INVENTION

The System

Referring now to FIG. 1, block 10 represents a multiple-track studio recorder provided with tracks 10A to 10D. In actual practice, such studio recorders have a larger number of separate tracks.

In recording a studio performance of a rock group or any other band of musicians, the modern practice is to divide the performing group into sections, each having its own microphone, and to record each section on a separate track. Thus the voice of a singer may be recorded on track 10A, the sounds of electronic guitars on track 10B, an electronic piano on track 10C, and that of drums which provide the accented beat on track 10D.

The reason for concurrent multiple track recordings is that it is then possible to blend these recordings in a mixer 11 whose output is applied to a master recorder 12. In this way, one can adjust the balance and relative dB level so as to provide a desired relationship between the respective sections of the groups. Thus it may be necessary to raise the dB level of the singer's voice and to reduce the level of the percussion, and this can readily be done in the mixer.

In the system shown, the recording on track 10D, which is that of the drums, is not fed to the mixer; hence if a master recording were made, it would lack the essential beat. Substituted for the recording on track 10D is the audio output of a music synthesizer 13. In this synthesizer the characteristic sound effects of a particular type of arcade game are synthesized for audio duplication, the sound effects being reduced to a single keystroke.

In the synthesizer, one may have synthesized the characteristic sound effects of various arcade electronic games, no two of which produce the same sound effects, for each game yields sound effects related to the nature of the game and reflecting the ingenuity of its creator.

Hence the sounds synthesized may be those yielded by a Nintendo, by a Sega electronic game or any other popular arcade game. When an operator 14 depresses a key, the synthesizer yields an audio pulse whose complex constituents are the arcade game sound effects selected by the operator for recording.

The audio output of music synthesizer 13 is fed into mixer 11 in the channel otherwise reserved for track 10D; hence fed into the mixer are the arcade game sound effects audio pulses, not the drummer's beat. The output of studio recorder 10 is applied to a suitable reproducer 15 which is heard by operator 14 who so operates the key of the synthesizer as to produce the audio pulses in synchronism with the drummer's beat. Hence while the drummer's beat is heard by the operator, it is not recorded in the master recording.

As a consequence, in the master recording of the rock group performance, the persistent, heavily accented beat is not that produced by a performer but by the operator of the music synthesizer. The final recording of the rock group therefore incorporates the synthesized arcade game sound effects in a percussive format to create an acoustical image in which the listener hears the rock music in a stimulating arcade-like environment.

To enhance this acoustic image, the introduction of the arcade game sound effects into the recording need not be limited to the beat, but may also be incorporated in musical phrases. Thus a pulsating whistle simulating spaceship movement may be blended into the music.

Disco Arcade Game Sound Laser Device

The common practice at disco clubs or concerts, when members of the audience wish to show their appreciation to the performers, is for them to flick on cigarette lighters, so that one looking over the audience sees a sea of flickering lights. The hazards which attend this practice are obvious, particularly in a crowded club or auditorium. It is also the practice in the course of a concert for members of the audience to clap their hands in keeping with the beat of the music. In many disco clubs, to enhance the decor, there are elaborate laser beam light displays.

The device 16 shown in FIG. 2 is in an elongated flashlight format and contains battery cells as the power source. Supported within the removable collar 17 at the front end of the device is a high-intensity bulb and means to focus rays from the bulb to provide a cylindrical high intensity light beam 18 simulating that projected by a laser. This light is turned on and off by a squeeze-type switch 19, making it possible for the user to produce pulses of light, as he pleases.

Housed within the cylindrical case of device 16 is an integrated circuit chip of a ROM (Read-Only-Memory) in which are stored in digital form several sound messages, each reduced to a pulse or packet format, the constituents of which are arcade game sound effects. These messages are generated by synthesizer 13 in FIG. 1, whose output audio pulses can be digitized and loaded in the ROM. As evidenced by U.S. Pat. No. 4,778,391 to Weiner, a ROM is capable of carrying out this function, it being also known to read out and decode a selected message from a ROM and to reproduce it.

A sound selector switch 20 is provided to select a desired sound-effects pulse from the ROM for decoding and readout for reproduction in a loudspeaker 21 installed at the other end of the device.

When, therefore, a member of the audience wishes to accompany the beat of a performing rock group with arcade game sound-effects pulses to accentuate the beat, he first by means of multi-position selector switch 20 selects the sounds to be reproduced. Then by operating an on-off switch button 22, he can press this button every time he hears the beat and thereby produce arcade game sound effects to accompany the beat.

While no one device, since its sound output is low compared to that of an amplified rock group, will have a perceptible effect on the performed music heard by the audience except in a limited area, should fifty or more of such devices be in concurrent use, their combined impact will have a pronounced influence on the beat. To that extent, the collective effect represents audience participation in the performance that goes beyond clapping, for now the nature of the beat is transformed to create an acoustical image putting the disco in the environment of an electronic game arcade.

In many discos, a romantic aura is produced by means of a sphere of rotating, multi-faceted mirrors which shoot out light in various directions as the sphere rotates. But a more impressive effect can be obtained under audience control by members of the audience, each with a device 16, in hand, projecting pulsed light beams in intersecting directions to create a complex pattern of illumination.

While there has been shown and described a preferred embodiment of music recordings incorporating percussive arcade-game sound effects in accordance with the invention, it will be appreciated that many changes and modifications may be made therein without, however, departing from the essential spirit thereof.

I claim:

1. A technique for recording a performance of a rhythmic musical work, such as rock music, having a persistent accented beat, said work being performed by a group of performers divided into sections, one section producing the sounds of the beat which accompany the musical sounds produced by the other sections of the group, said technique comprising the steps of:
   (a) recording on corresponding tracks of a multiple-track recorder the sounds produced by said sections of the group, one of the tracks having recorded thereon the beat, the other tracks having recorded thereon the sounds produced by the other sections;
   (b) simulating in a music synthesizer for audio duplication sound effects associated with a particular arcade electronic game and reducing these sound effects to a single keystroke to produce, when the key is operated at a time coincident with that of the beat recorded on said one track, a percussive audit pulse whose constituents are the sound effects; and
   (c) recording in a master recorder the audio pulses yielded by the synthesizer in place of the beat together with the sounds recorded in said other tracks to produce a master recording of the work, whereby when the master recording is played back, it incorporates these pulses to define the accented beat of the music whereby a listener thereto receives an acoustic impression in which the music is heard in an arcate-like environment, the recordings on said other tracks of the multiple-track recorder being fed to a mixer whose output is applied to said master recorder, to which mixer is also fed the audio pulses from the synthesizer.

2. A system for recording a performance of a rhythmic musical work such as a rock music having a persistent, accented beat, said work being performed by a group of performers divided into sections, one of which produces the sounds of the beat which accompany the musical sounds produced by the other sections of the group, said system comprising:
   (a) a music synthesizer in which there is simulated for audio reproduction sound effects characterizing a particular arcade electronic game, the sound effects being reduced to a single keystroke whereby when an operator presses the key at a time coincident with that of the beat, a complex percussive audio pulse is generated whose constituents are the arcade sounds:
   (b) a multiple track recorder in which the sounds produced by said sections of the group are recorded on corresponding tracks, one of the tracks having recorded thereon the beat, the other tracks having recorded thereon the sounds produced by the other sections; and
   (c) a master recorder for recording the audio pulses produced by the synthesizer together with the sounds recorded in said other tracks to produce a master recording in which the pulses are substituted for the beat.

3. A system as set forth in claim 2, wherein stored in the synthesizer are sound effects characterizing a plurality of different arcade games, one of which is selected by the operator to provide the percussive pulse.

* * * * *

UNITED STATES PATENT AND TRADEMARK OFFICE
CERTIFICATE OF CORRECTION

PATENT NO. : 5,206,842
DATED : April 27, 1993
INVENTOR(S) : Donald Spector

It is certified that error appears in the above-indentified patent and that said Letters Patent is hereby corrected as shown below:

Column 5, Claim 1, line 31, delete "audit" and substitute -- audio--.

Signed and Sealed this

Eleventh Day of January, 1994

Attest:

BRUCE LEHMAN

Attesting Officer        Commissioner of Patents and Trademarks